United States Patent [19]

Girard

[11] Patent Number: 4,703,361

[45] Date of Patent: Oct. 27, 1987

[54] PICTURE MULTIPLEX ANALYSIS HYBRID DEVICE

[76] Inventor: André Girard, 52, avenue Jean Jaurés, 92290 Chatenay Malabry, France

[21] Appl. No.: 754,446

[22] Filed: Jul. 12, 1985

[30] Foreign Application Priority Data

Jul. 18, 1984 [FR] France ................... 84 11398

[51] Int. Cl.$^4$ .............................................. H04N 1/40
[52] U.S. Cl. .................................. 358/260; 358/133; 358/167; 358/284
[58] Field of Search ............... 358/212, 133, 260, 284, 358/166, 167, 283, 294; 382/43, 44, 42

[56] References Cited

U.S. PATENT DOCUMENTS 4,482,923  11/1984  Fischer et al. ...................... 358/283
4,516,178  5/1985  Jung et al. ........................... 358/283

FOREIGN PATENT DOCUMENTS 2140914  1/1973  France .
2537277  6/1984  France .

OTHER PUBLICATIONS

Nouvelle Revue d'Optique, vol. 7, No. 4, pp. 221–234, Jul./Aug. 1976.

Primary Examiner—Edward L. Coles, Sr.
Attorney, Agent, or Firm—Laubscher & Laubscher

[57] ABSTRACT

A picture multiplex analysis hybrid device comprising a device for forming the picture of an object in a given plane, a plurality of photodetectors forming a mosaic thereof, and a plurality of optical devices sending the light from a sector of the picture in its plane to a respective photodetector. The number of optical devices is equal to that of the photodetectors, wherein the light beams received in the elementary areas forming a picture sector are modulated by a moving encoding grid comprising opaque portions corresponding to a binary 0 and transparent portions corresponding to a binary 1, the grid modulating each beam by a binary, periodic and pseudo-random function, the beams emanating from the elementary areas being modulated by identical parts of the grid.

6 Claims, 11 Drawing Figures

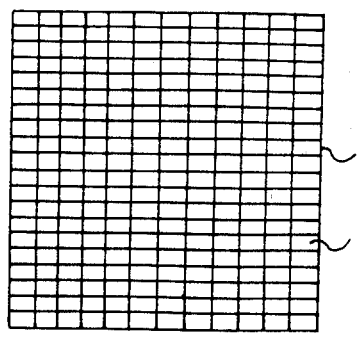
FIG. 4
| 0 0 1 1 1 | 0 1 1 0 0 | 1 0 1 0 0 | 0 0 1 1 1 | 0 1 1 0 0 |
| 0 1 1 0 0 | 1 0 1 0 0 | 0 0 1 1 1 | 0 1 1 0 0 | 1 0 1 0 0 |
| 1 0 1 0 0 | 0 0 1 1 1 | 0 1 1 0 0 | 1 0 1 0 0 | 0 0 1 1 1 |
| 0 0 1 1 1 | 0 1 1 0 0 | 1 0 1 0 0 | 0 0 1 1 1 | 0 1 1 0 0 |
| 0 1 1 0 0 | 1 0 1 0 0 | 0 0 1 1 1 | 0 1 1 0 0 | 1 0 1 0 0 |
| 1 0 1 0 0 | 0 0 1 1 1 | 0 1 1 0 0 | 1 0 1 0 0 | 0 0 1 1 1 |
| 0 0 1 1 1 | 0 1 1 0 0 | 1 0 1 0 0 | 0 0 1 1 1 | 0 1 1 0 0 |
| 0 1 1 0 0 | 1 0 1 0 0 | 0 0 1 1 1 | 0 1 1 0 0 | 1 0 1 0 0 |
| 1 0 1 0 0 | 0 0 1 1 1 | 0 1 1 0 0 | 1 0 1 0 0 | 0 0 1 1 1 |
FIG. 7a
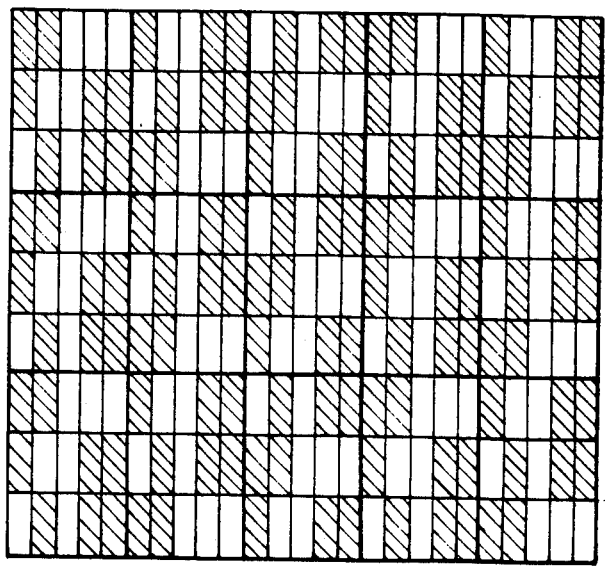
FIG. 7b

PICTURE MULTIPLEX ANALYSIS HYBRID DEVICE

BACKGROUND OF THE INVENTION

1. Field of the Invention

The present invention relates to an improvement in apparatus that serves in determining the distribution of luminance on the surface of an object, and more particularly, a picture analyzer based on multiplex optical encoding in which the analysis is of the hybrid type, or in other words is carried out simultaneously by spatial multiplexing and time multiplexing.

The basic concept common to all picture analyzing multiplex systems is to encode the N picture elements by a set of N functions as little mutually correlated as possible, i.e. by using a set of orthogonal functions. In conventional analysis systems, these functions are assimilable to narrow slots mutually off-set in time. As a result, the energy from any given picture element reaches the detector only for a short fraction of the overall analysis time. For multiplex analysis, the set of orthogonal functions used is such that the energy from a picture element goes to the detector for half the overall analysis time.

2. Description of the Prior Art

Picture multiplex analysis systems are known (of French Pat. No. 2, 140, 914 published Jan. 19, 1973 in which the set of orthogonal functions consists of pseudo-random cyclic binary functions of the type:

$$N = 2^k - 1$$

Functions of this type are built up by determining the set of all the possible sequences of k bits. The starting point is any distribution of k bits carrying the value 1 and 0 (with the exception of k bits all at 1). The following distribution is obtained by eliminating the last bit and by moving the others to the sight by one unit. The first bit in the new line carries the value of the product of the last two bits in the previous line as in the truth table for the OR-exclusive function.

The operation is repeated until the initial sequence is obtained again. If this situation were to arise before all the possibilities have been exhausted (there are $(2^k-1)$), the operation can be resumed by giving the first bit in the new sequence the value of the last bit times the anti-penultimate bit in the previous sequence.

In the case of k=3, the words obtained by this procedure are as follows:

```
0 1 1
1 0 1
0 1 0
0 0 1
0 0 0
1 0 0
1 1 0
0 1 1
```

A pseudo-random sequence in the above table is selected, e.g. the sequence boxed in. Other words are obtained through circular permutation by placing the last point (i.e. point with rank N) in the first position and by shifting all the others points by one unit (the first becomes second, the second becomes third, etc . . . ). In building this way, it is therefore possible to obtain N different words which together are a set constituting the coding matrix α.

$$\alpha = \begin{matrix} 1 & 1 & 0 & 1 & 0 & 0 & 0 \\ 1 & 0 & 1 & 0 & 0 & 0 & 1 \\ 0 & 1 & 0 & 0 & 0 & 1 & 1 \\ 1 & 0 & 0 & 0 & 1 & 1 & 0 \\ 0 & 0 & 0 & 1 & 1 & 0 & 1 \\ 0 & 0 & 1 & 1 & 0 & 1 & 0 \\ 0 & 1 & 1 & 0 & 1 & 0 & 0 \end{matrix}$$

The matrix α is symmetrical. The fundamental property of the coding matrix α is written as follows:

$$L \cdot L = L \cdot L^I = \frac{N-1}{2} \times |1| \quad (1)$$

$\alpha^T$ is the transposed matrix of $\alpha$ and $|1|$ is the unit matrix of rank N.

By expressing the general term for the matrix α by $l_j^i$, equation (1) may be written as:

$$\sum_{j=1}^{j=N} l_j^i l_j^{(i+p)} = \begin{cases} \frac{N+1}{4} - 1 & si\ p \neq 0 \\ \frac{N-1}{2} & si\ p = 0 \end{cases} \quad (2)$$

The lines in matrix α are hence not strictly orthogonal. Condition (1) is referred to as the transorthogoclity condition.

The encoding operation consists of successively superposing the encoding matrix lines on the distribution of the picture pixels. As a result of the code being cyclic in nature, it is merely a matter of shifting the encoding function by a unit step parallel to the distribution of the picture pixels at each coding operation. The encoded picture is the set provided by the measurements in the flux emerging from the distribution in the various positions of the code pattern. The number of independant measurements is therefore equal to the number of bits in the encoding function.

The encoding function is represented by the transparent and opaque zones (transmission factor 1 and 0) whose distribution gives the matrix α.

Thus in the prior art, the distribution in luminance is determined on the basis of the multiplex analysis of an object picture, by implementing a picture detector and a moving grid that is designed to modulate the luminous flux emitted at each pixel in the picture by the value of the terms in a pseudo-random binary periodic function. The modulated (encoded) picture thus obtained is then demodulated (decoded) by correlating the signals the picture receiver delivers with a replica of the modulation function generated by the grid. This picture analyzing procedure reduces the effect caused by the inherent noise peculiar to the picture receiver on the luminance measurements made.

The technical progress that has been achieved is such that the noise peculiar to the picture receivers has been considerably reduced and the accuracy of the measurements obtained by this time-based multiplex analysis procedure is now limited by the noise due to the fluctuations in flux of incident photons received by the sensitive surface of the receiver.

SUMMARY OF THE INVENTION

To cure the effect of the photon noise, the invention consists of dividing the picture into zones to distribute the luminous flux modulated by the grid no longer over a single detector but over a mosaic of photoelectric detectors. For this purpose, the encoded picture is sampled by means of optical members transmitting the respective samples over the sensitive surfaces of the detectors, and the decoding operation is carried out simultaneously on each sample.

The encoding grid consists of a strip comprising as many encoding zones as there are photoelectric detectors, that is wrapped around a cylinder and the encoded picture is sampled by a mosaic of spheroplanar lenses the convexes faces of which are oriented towards the detectors.

A further embodiment of the invention consists of sampling the encoded picture by means of a set of convergent/divergent light guides associated with a mosaic of photoelectric detectors similar to the mosaic described in French Pat. No. 2 537 277 published June 8, 1984.

The demodulation or decoding operation in relation to the electrical signals delivered by each of the detectors is performed by known digital methods (cf. Nouvelle Revue d'Optique—July/August, 1976 Vol. 7, No. 4, pages 221-234) or by means of an analog device comprising light sources and optical members sending the luminous flux produced to a decoding grid identical to the encoding grid and running at the same speed.

The picture under analysis carries N pixels, m lines and n columns. N=m(lines)×n(columns). The picture is split into P sectors comprising q lines (m/q integer) and r columns (r/n integer). Each sector therefore contains s=N/P=qr points. These sectors are indicated by 10 on FIG. 1.

The s points in each sector P are analyzed simultaneously by means of a pseudo-random binary code ($s=qr=2^\alpha-1$, $\alpha$ is integer), repeated P times on the same support. This analysis is executed by translating the mono or bidimensional code support depending on the code used; the amplitude of the support is small (<1 mm), and can be assimilated to a "micro scan). If s spatial points in each sector are to be analyzed, then s measurements are required during translation.

The flux energing from each sector 10 is focused by an elementary lens on a photodetector with a sensitive surface coincident with the input pupil to the system.

The number of detectors is equal to P, as is the number of elementary lenses. These lenses are joined and bonded on a common planar support. The spacing between the axes of the detectors is equal to that separating the centers of the elements in the "Fly's eye" formed by the lenses (FIG. 2).

| Examples of values | | |
| --- | --- | --- |
| q = 3 | r = 5 | s = 15 |
| q = 7 | r = 9 | s = 63 |

BRIEF DESCRIPTION OF THE DRAWINGS

The invention will now be described in relation to the appended drawings in which:

FIG. 4 represents a planar view of the lens mosaic or fly's eye;

FIGS. 7a and 7b represent the encoding grid;

DESCRIPTION OF THE PREFERRED EMBODIMENTS

A description will now be given of various embodiments of the picture analysing system as in the invention.

Figure 1:
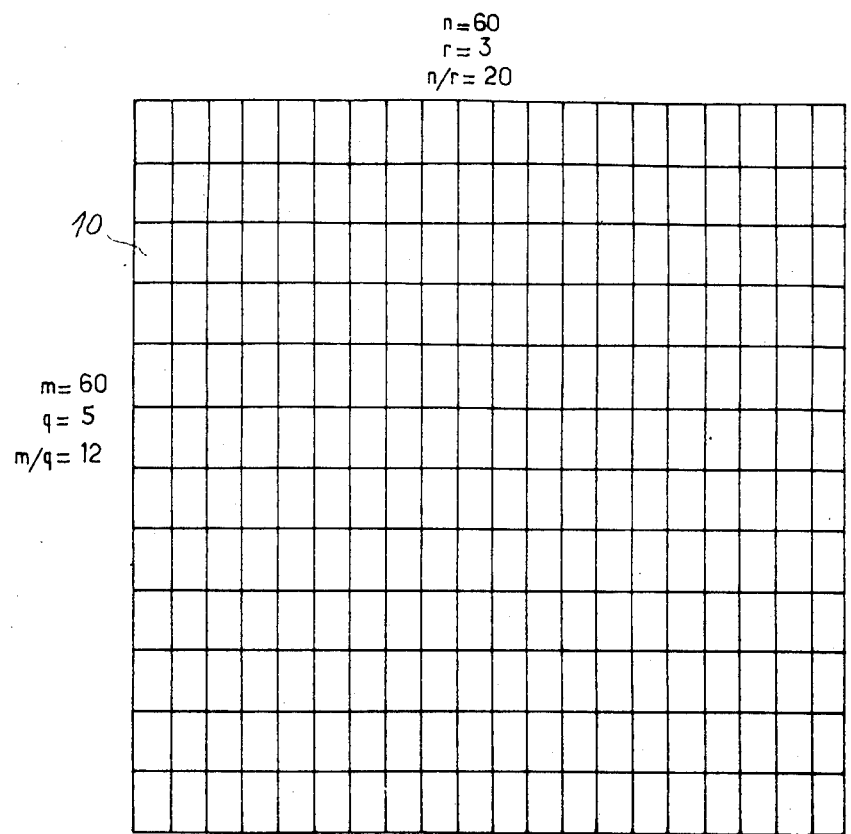
FIG. 1 represents the sectors into which the picture under analysis is divided, the points inside the sector being processed by time-based multiplexing, the points and the sectors themselves being processed by space multiplexing.
Figure 2:
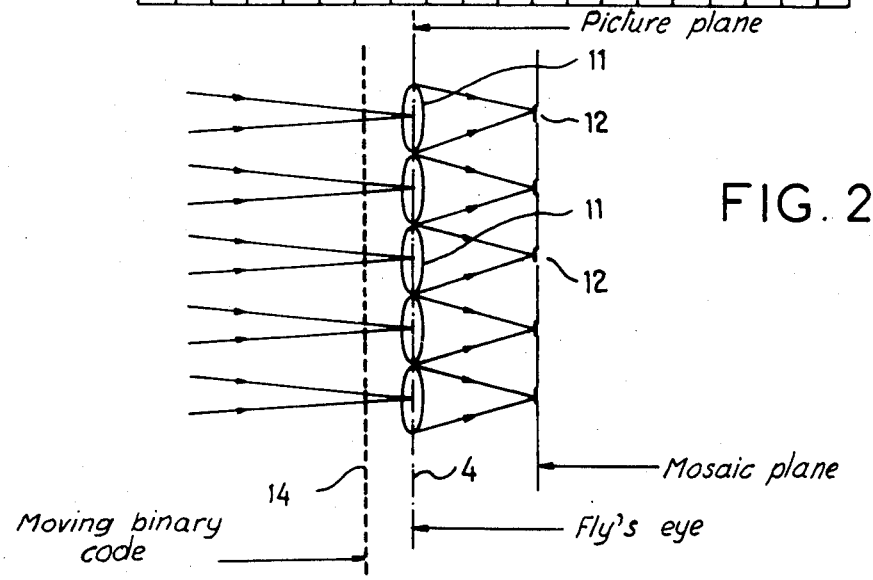
FIG. 2 is a schematic view of the lens mosaic, the detector mosaic and the encoding grid.
Figure 3:
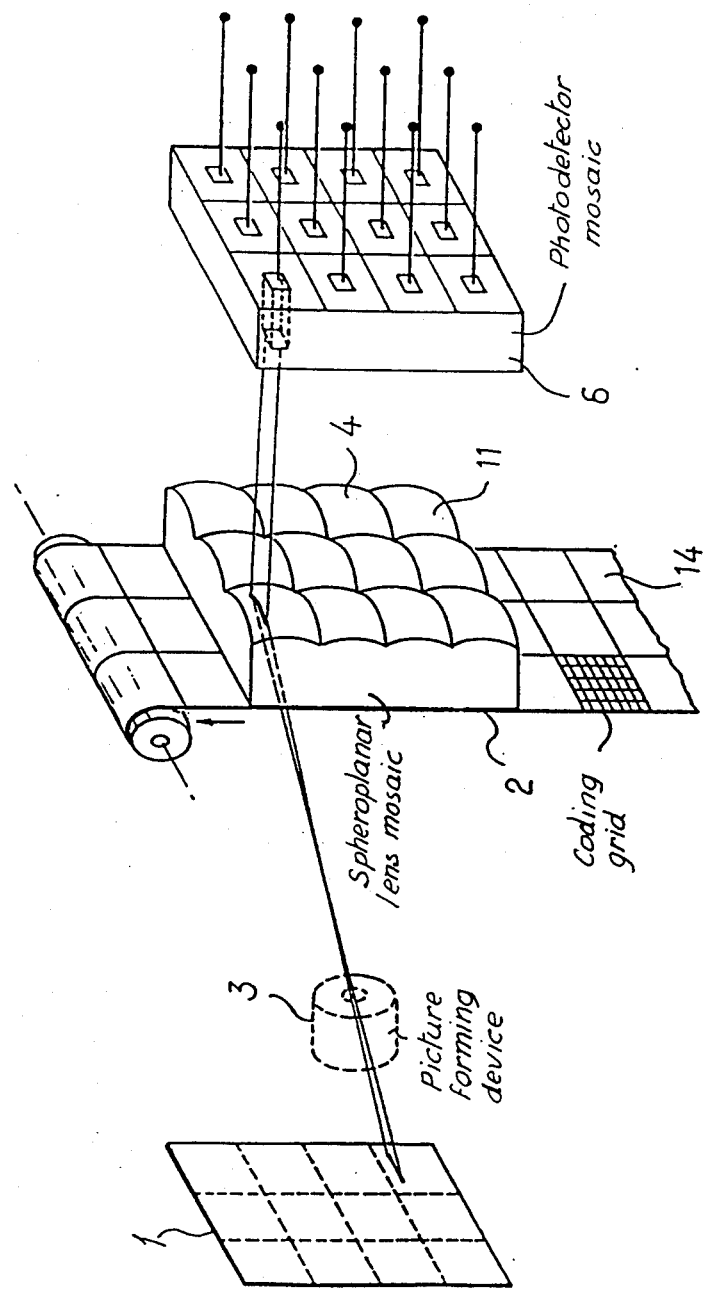
FIG. 3 is a detail view of the encoding device showing the encoding grid, the lens mosaic and the detector masaic.

With reference to FIGS. 2 and 3, the picture 2 of an object 1 is formed in the focal plane of an optical device 3 for forming pictures that can be a telescope or an objective lens. Although the picture forming system depicted in FIGS. 2 and 3 is a lens, it will be assumed that this optical device is a telescope with a diameter D=0.60 m and focal length F=100 m that is limited by diffraction at $\lambda=10$ μm. The value of the sampling pitch is given by:

$$\frac{F\lambda}{2D} = 0.83 \text{ mm}$$

The parameters will be chosen with the following values:
m=60 lines
n=60 columns
N=60×60 pixels
q=5 lines
r=3 columns
m/q=12
n/r=20
P=(m/q)×(n/r)=240
s=qr=15 and the interval between lines and between columns is chosen as 0.83 mm. The dimensions of a sector are therefore:

(0.83×5)×(0.83×3)×4.15×2.5 mm and those of the picture (0.83×60)×(0.83×60)≃50×50 mm.

Figure 5:
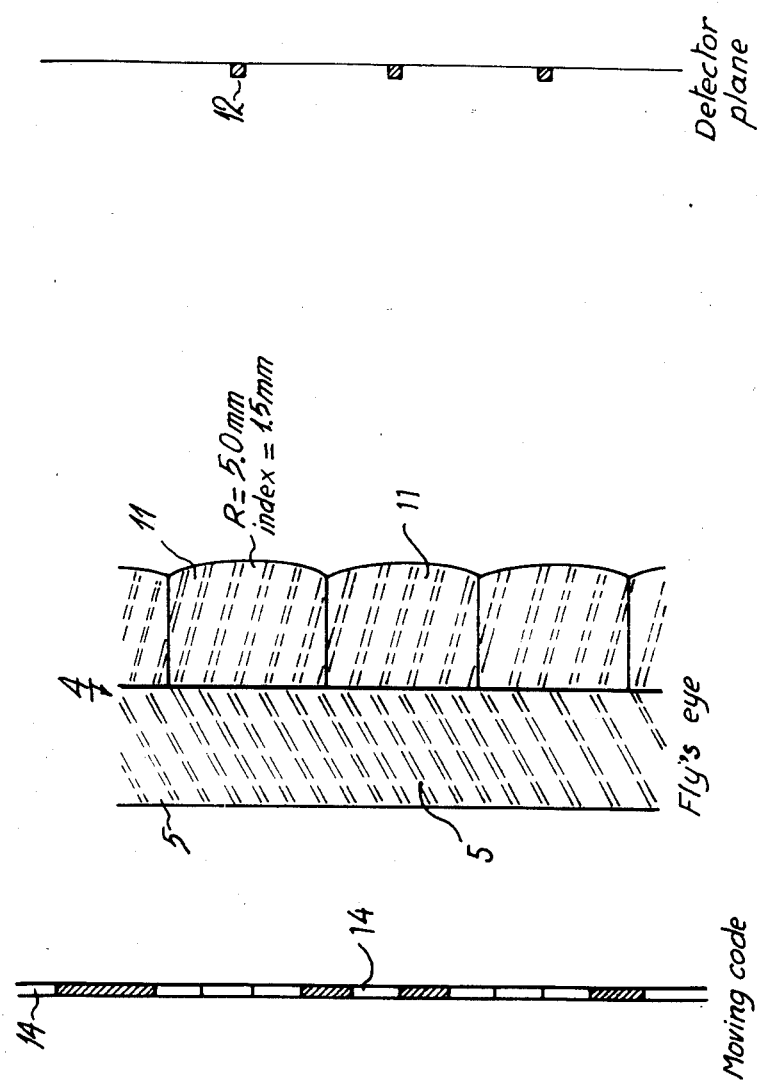
FIG. 5 represents a cross-section of the fly's eye.

The fly's eye 4 is made up of small spheroplanar lenses 11 that have a focal length equal to 10 mm and are bonded together on a transparent plate (FIG. 5). These lenses have the same transverse dimensions as the picture sector and are equal in number, i.e. 240, which forms a square 50 mm by 50 mm. The lenses can be made of barium fluoride or zinc selenide.

The lenses 11 forming the fly's eye are given in FIGS. 4 and 5, a planar view in FIG. 4 and a cross-section in FIG. 5. They have the same shape and dimensions as the picture sectors, the radius of the spherical surfaces is R=5 mm and the refractive index is 1.5. They are bonded to the planar support 5. They send the radiation modulated by the moving code grid 14 to the related detectors 12.

Figure 6:
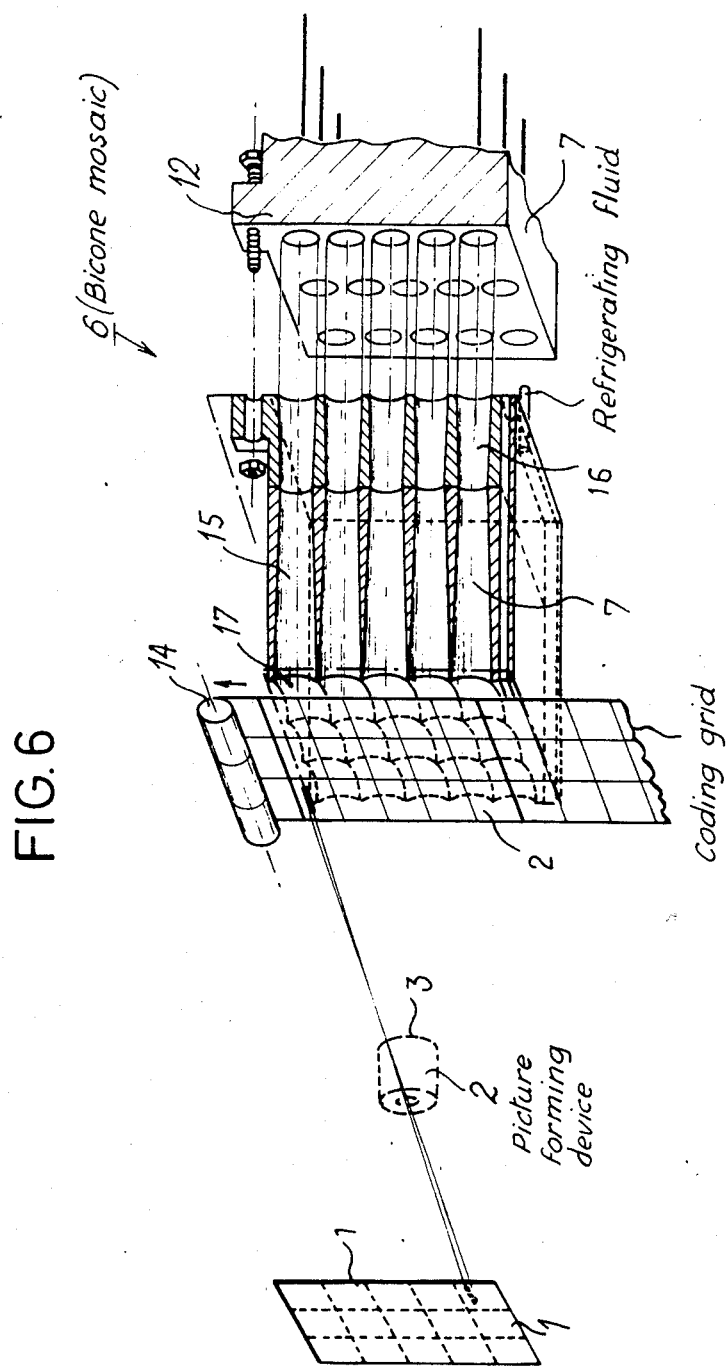
FIG. 6 represents a further embodiment of the analyzing device in which the fly's eye is formed of a mosaic of bicones.

In FIG. 3, the light rays that travel through the elementary lenses 11 propagate through air before arriving at the photodetector mosaic 6. In FIG. 6, the lens matrix is replaced by a bicone matrix 7. This matrix consists of a plurality of bicones carrying a convergent portion 15 and a divergent portion 16. The convergent tubes 16 feature an aperture 17 in the plane of which the picture 2 is formed and the divergent tubes 16 finish at the detectors 12. The matrix is cooled by a refrigerating fluid. A matrix of bicones is described in the aforementioned French Pat. No. 2 537 277.

The beams emanating from the various object pixels are modulated by a moving grid 14. This grid is as described in the prior art using a 15th order encoding matrix. To form this matrix, the procedure is as explained in the foregoing. A pseudo-random sequence corresponding to k=4 is first of all formed:

```
0 1 1 0
0 0 1 1
1 0 0 1
0 1 0 0
1 0 1 0
0 1 0 1
0 0 1 0
0 0 0 1
0 0 0 0
1 0 0 0
1 1 0 0
1 1 1 0
0 1 1 1
1 0 1 1
1 1 0 1
0 1 1 0
```

A sequence of 15 bits is then formed and the bits therein are permutated in a circular fashion.

```
0 1 1 0 0 1 0 1 0 0 0 0 1 1 1
1 1 0 0 1 0 1 0 0 0 0 1 1 1 0
1 0 0 1 0 1 0 0 0 0 1 1 1 0 1
0 0 1 0 1 0 0 0 0 1 1 1 0 1 1
0 1 0 1 0 0 0 0 1 1 1 0 1 1 0
1 0 1 0 0 0 0 1 1 1 0 1 1 0 0
0 1 0 0 0 0 1 1 1 0 1 1 0 0 1
1 0 0 0 0 1 1 1 0 1 1 0 0 1 0
0 0 0 0 1 1 1 0 1 1 0 0 1 0 1
0 0 0 1 1 1 0 1 1 0 0 1 0 1 0
0 0 1 1 1 0 1 1 0 0 1 0 1 0 0
0 1 1 1 0 1 1 0 0 1 0 1 0 0 0
1 1 1 0 1 1 0 0 1 0 1 0 0 0 0
1 1 0 1 1 0 0 1 0 1 0 0 0 0 1
1 0 1 1 0 0 1 0 1 0 0 0 0 1 1
```

If the encoding were unidimensionally achieved in lines of 15 pixels, then the flux 15 aligned pixels would need to be modulated respectively by 15-bit code words of the encoding matrix.

If the encoding operation is bidimensional, the 15-bit encoding words are arranged on the grid 14 in three words of 5 bits, thereby giving for example the three following 5-bit words for the 15-bit word

```
0 1 1 0 0 1 0 1 0 0 0 0 1 1 1 :
```

-continued
```
0 1 1 0 0
1 0 1 0 0
0 0 1 1 1
```

Instead of circularly permutating the 15-bit encoding words, the 5×3 patterns are permutated in the following manner:

```
0 1 1 0 0     1 0 1 0 0     0 0 1 1 1
1 0 1 0 0     0 0 1 1 1     0 1 1 0 0
0 0 1 1 1     0 1 1 0 0     1 0 1 0 0
``` as depicted in FIGS. 7a and 7b. The circular permutations relative to the 15-bit words are replaced by a circular permutation of the 5-bit words and a circular permutation of groups of three words. In both cases, this gives fifteen possible states.

For each sector, the encoding grid is the same since the sectors are separated by spatial and not time multiplexing.

Figure 8:
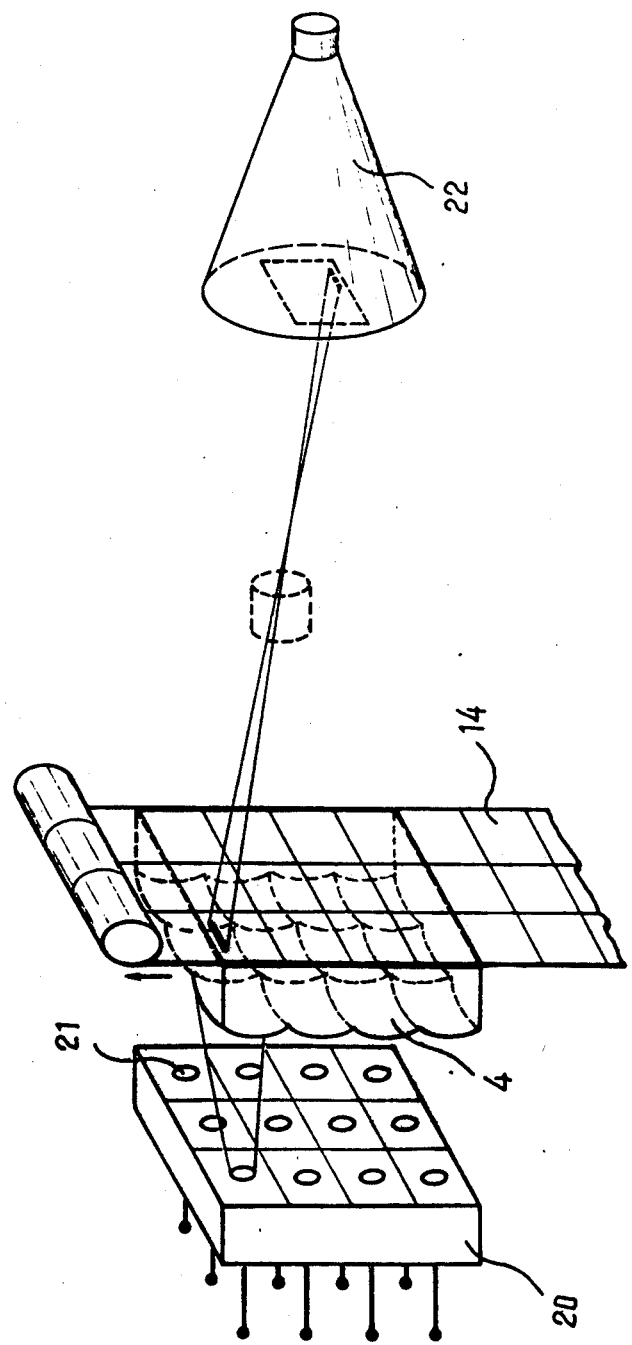
FIG. 8 is a view of the decoding device.

FIG. 8 represents the picture decoding and recovery system.

The detector matrix 6 in FIG. 3 or the detector matrix 7 in FIG. 6 is connected to a matrix 20 of light emitting diodes 21 in which said diodes 21 have the same pitch spacing as the detectors 12. The matrix 20 emits light beams in the direction of a picture tube 22 through the lens matrix 4, and the decoding grid 14 (identical to the encoding grid). The same movement (speed and amplitude) is imparted to this grid as in the encoding case.

Figure 9:
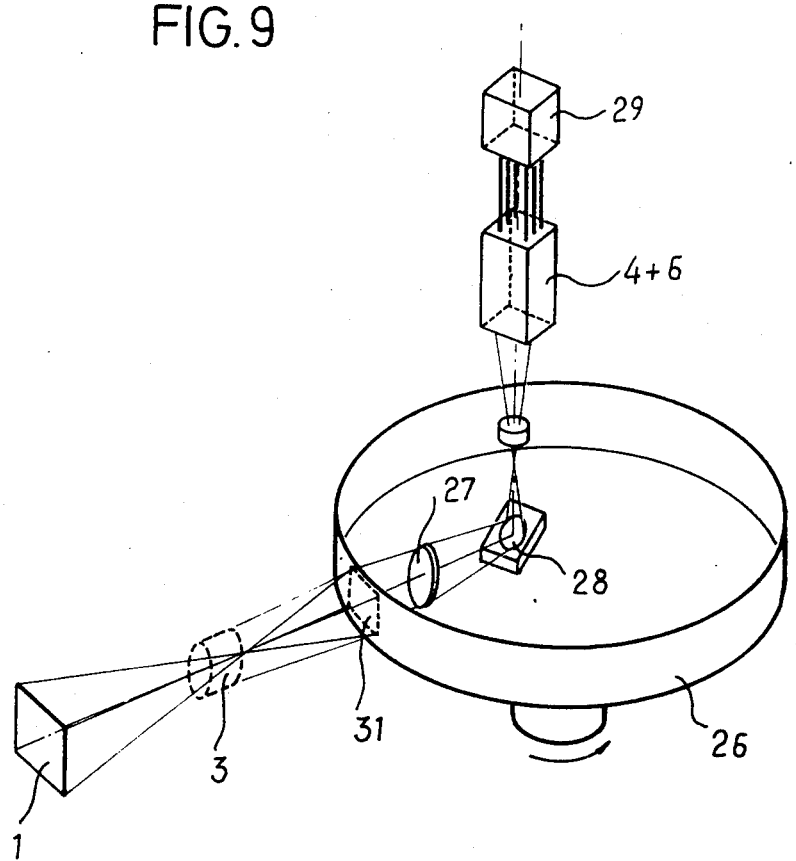
FIGS. 9 and 10 represent a picture endocing and decoding system with rotating grid.
Figure 10:
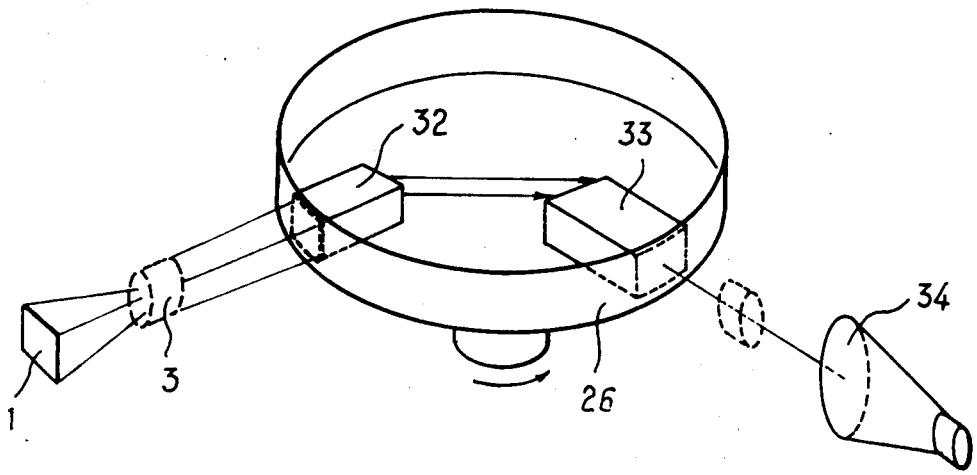

Upto this point, it has been assumed that the grid 14 was moved translationally. FIGS. 9 and 10 represent a picture analyzing device with hybrid multiplexing in which the grid is made up of perforations or full areas in a rotating drum 26.

In FIG. 9, the object 1 is projected onto a mosaic of detectors 6 through an objective lens 3, the grid 31, a lens 27 and a mirror 28. The detector mosaic 6 is connected to a digital computer 29 that performs the decoding operation.

Digital decoding of a picture encoded by multiplication of an analog matrix by a pseudo-random binary function is described in the aforesaid document "Nouvelle Revue d'Optique", 1976, t. 7 no. 4, pages 221–234 "Picture Analysis by Multiplex Optical Encoding" by J. Appel and A. Girard.

FIG. 10 depicts the analog decoding device with a grid 31 on a drum 26. FIG. 10 also shows the object 1, the objective lens 3, the rotating grid 26, and a block 32 containing the lens mosaic 4 and the detector mosaic 6. This block 32 is connected to another block 33 containing the mosaic 20 of light emitting diodes and the lens mosaic 4. The beams leaving the block 32 travel through the grid 31 and fall on the picture tube 34. It will be observed that FIG. 10 closely resembles FIG. 8 except in that the grid is rotational.

What I claim is:

1. Picture multiplex analyzing apparatus, comprising
    (a) means (3) for forming the picture of an object in a given plane;
    (b) a plurality of photodetectors forming a mosaic thereof (6);
    (c) a plurality of optical devices (11) each sending light from a sector of the picture in its plane to the associated photodetector, respectively, the number of optical devices being equal to the number of photodetectors; and (d) encoding grid means (14) mounted for movement adjacent the plane of the picture for modulating the light beams received in the elementary areas forming a picture sector, said grid means including opaque portions corresponding to a binary 0, and transparent portions corresponding to a binary 1, said grid means being operable to modulate each elementary area beam by a binary, periodic and pseudo-random function, said beams being modulated by identical parts of said grid means.

2. Apparatus as defined in claim 1, wherein said optical devices comprise elementary lenses (11) filling the spaces in the picture sectors, respectively.

3. Apparatus as defined in claim 1, wherein said optical devices comprise elementary optical tubes having optical apertures which fill the spaces in the picture sectors, respectively.

4. Apparatus as defined in claim 3, wherein each of said optical tubes includes a convergent portion (15) receiving light from a picture sector, and a divergent portion (16) having an aperture oriented toward the associated photodetector, respectively.

5. Apparatus as defined in claim 1, wherein said grid means (14) is generally planar and is displaced laterally in a direction, parallel with the plane of the picture.

6. Apparatus as defined in claim 1, wherein said grid means (26) has a generally cylindrical drum-like configuration, said grid means being mounted for rotation about its longitudinal axis adjacent, and generally tangentially of, the plane of the picture.

* * * * *